(12) United States Patent
Liang et al.

(10) Patent No.: US 12,724,198 B2
(45) Date of Patent: Sep. 1, 2026

(54) SPOT-SIZE CONVERSION STRUCTURE AND PHOTONIC DEVICE

(71) Applicant: NANJING LYCORE TECHNOLOGIES CO., LTD., Nanjing (CN)

(72) Inventors: Hanxiao Liang, Suzhou (CN); Yipin Song, Suzhou (CN); Yingcong Zhou, Suzhou (CN); Haicang Wu, Suzhou (CN); Wenhao Mao, Suzhou (CN); Shiwei Song, Suzhou (CN); Weiqi Sun, Suzhou (CN); Qingyang Yu, Suzhou (CN)

(73) Assignee: NANJING LYCORE TECHNOLOGIES CO., LTD., Nanjing (CN)

( * ) Notice: Subject to any disclaimer, the term of this patent is extended or adjusted under 35 U.S.C. 154(b) by 275 days.

(21) Appl. No.: 18/691,312

(22) PCT Filed: Jul. 7, 2022

(86) PCT No.: PCT/CN2022/104331
§ 371 (c)(1),
(2) Date: Mar. 12, 2024

(87) PCT Pub. No.: WO2023/050965
PCT Pub. Date: Apr. 6, 2023

(65) Prior Publication Data

US 2024/0377585 A1 Nov. 14, 2024

(30) Foreign Application Priority Data

Sep. 28, 2021 (CN) .......................... 202111158077.8

(51) Int. Cl.
*G02B 6/122* (2006.01)

(52) U.S. Cl.
CPC .................................. *G02B 6/1228* (2013.01)

(58) Field of Classification Search
None
See application file for complete search history.

(56) References Cited

U.S. PATENT DOCUMENTS 6,310,995 B1 10/2001 Saini et al.
2008/0080808 A1 4/2008 Tolshikhin et al.
(Continued)

FOREIGN PATENT DOCUMENTS

CN 105679875 6/2016
CN 211928243 11/2020
(Continued)

OTHER PUBLICATIONS

Extended European Search Report in European Appln. No. 22874362.1, mailed on Oct. 2, 2024, 10 pages.
(Continued)

*Primary Examiner* — Chad H Smith
(74) *Attorney, Agent, or Firm* — Fish & Richardson P.C.

(57) ABSTRACT

A spot-size conversion structure and a photonic device. The spot-size conversion structure includes: a substrate, an isolation layer and a waveguide layer arranged in sequence. The waveguide layer includes N sub-waveguide layers arranged in sequence along a direction away from the substrate, each of the sub-waveguide layers being of a protrusion shape, and N being a natural number and N≥3. Wherein, the spot-size conversion structure has a first end face configured to be coupled to an integrated optical waveguide, and a second end face opposite to the first end face and configured to be coupled to an optical fiber.

16 Claims, 4 Drawing Sheets

(56) References Cited

U.S. PATENT DOCUMENTS

| | | | | |
|---|---|---|---|---|
| 2012/0076465 | A1* | 3/2012 | Chen | G02B 6/1228 385/124 |
| 2013/0170793 | A1 | 7/2013 | Ushida et al. | |
| 2016/0041340 | A1 | 2/2016 | Shi et al. | |
| 2016/0306117 | A1 | 10/2016 | Middlebrook et al. | |
| 2018/0348432 | A1 | 12/2018 | Lambert et al. | |
| 2019/0170944 | A1* | 6/2019 | Sodagar | G02B 6/305 |

FOREIGN PATENT DOCUMENTS

| | | | |
|---|---|---|---|
| CN | 112596161 | | 4/2021 |
| CN | 112904481 | | 6/2021 |
| CN | 113093333 | | 7/2021 |
| CN | 113568106 | | 10/2021 |
| JP | H08-171020 | | 7/1996 |
| JP | 2003-533896 | A | 11/2003 |
| JP | 2005-043556 | A | 2/2005 |
| JP | 2006-030733 | A | 2/2006 |
| JP | 2009-545013 | A | 12/2009 |
| JP | 2014-174335 | A | 9/2014 |
| JP | 2015-057649 | A | 3/2015 |
| WO | WO 2012042795 | A1 | 4/2012 |
| WO | WO 2020172585 | A1 | 8/2020 |

OTHER PUBLICATIONS

Mizuno et al., "Compact and Low-Loss Arrayed Waveguide Grating Module With Tolerance-Relaxed Spot-Size Converter," IEEE Photonics Technology Letters, Feb. 2003, 15(2):239-241.

Office Action in Japanese Appln. No. 2024-518736, mailed on Jan. 24, 2025, 8 pages (with English translation).

Gao et al., "Cantilever Edge Coupler for Lithium Niobate on Insulator Platform," Paper, Presented at the 2021 Conference on Lasers and Electro-Optics (CLEO), San Jose, CA, USA, May 9-14, 2021; IEEE, Oct. 29, 2021, 2 pages.

Office Action in Japanese Appln. No. 2024-518736, mailed on Jun. 6, 2025, 6 pages (with English translation).

Ying et al., "Low-loss edge-coupling thin-film lithium niobate modulator with an efficient phase shifter," Optics Letters, Mar. 15, 2021, 46(6):1478-1481, 5 pages.

* cited by examiner

SPOT-SIZE CONVERSION STRUCTURE AND PHOTONIC DEVICE

CROSS-REFERENCE TO RELATED APPLICATION

This application is a National Stage of International Application No. PCT/CN2022/104331, filed on Jul. 7, 2022, which claims priority to Chinese Patent Application No. 202111158077.8, filed on Sep. 28, 2021. Both of the aforementioned applications are hereby incorporated by reference in their entireties.

TECHNICAL FIELD

The present disclosure relates to the technical field of photons, and in particular, to a spot-size conversion structure and a photonic device.

BACKGROUND

An optical waveguide is a dielectric apparatus that guides the propagation of light waves therein, and is also referred to as a dielectric optical waveguide. There are mainly two types of optical waveguides: one type is integrated optical waveguides, comprising a planar dielectric optical waveguide and a slab dielectric optical waveguide, which generally serve as a part of an optoelectronic integrated device, so they are referred to as integrated optical waveguides; and the other type is cylindrical optical waveguides, which are usually referred to as optical fibers.

A technology of coupling the integrated optical waveguide to the optical fiber has very wide and important applications in the fields of optical communications, microwave photonics, laser beam deflection, wavefront modulation, etc. Edge coupling is a common way used to couple the integrated optical waveguide to the optical fiber.

However, how to improve the coupling efficiency between the integrated optical waveguide and the optical fiber has always been an important topic under research for those skilled in the art because of the great difference in spot size between the integrated optical waveguide and the optical fiber.

SUMMARY

According to an aspect of the present disclosure, a spot-size conversion structure is provided, including: a substrate, an isolation layer and a waveguide layer arranged in sequence, the waveguide layer including N sub-waveguide layers arranged in sequence along a direction away from the substrate, each of the sub-waveguide layers being of a protrusion shape, and N being a natural number and N≥3, where: the spot-size conversion structure has a first end face configured to be coupled to an integrated optical waveguide, and a second end face opposite to the first end face and configured to be coupled to an optical fiber; in the direction away from the substrate, an orthographic projection of an $(n+1)^{th}$ sub-waveguide layer of the N sub-waveguide layers on the substrate falls within an orthographic projection of an $n^{th}$ sub-waveguide layer of the N sub-waveguide layers on the substrate, n being a natural number and 1≤n≤N−1; a width of an orthographic projection of each of the sub-waveguide layers on the substrate is gradually narrowed in a direction away from the first end face; and a wide end of each of the sub-waveguide layers extends to the first end face, a narrow end of a first sub-waveguide layer extends to the second end face or is at a distance from the second end face, and a narrow end of the $(n+1)^{th}$ sub-waveguide layer is at a distance from a narrow end of the $n^{th}$ sub-waveguide layer.

In some embodiments, a thickness c of at least one sub-waveguide layer of the N sub-waveguide layers other than an $N^{th}$ sub-waveguide layer and an $(N-1)^{th}$ sub-waveguide layer satisfies: c≤200 nm.

In some embodiments, each of the sub-waveguide layers includes a plurality of waveguide segments, the plurality of waveguide segments including a reduced-width waveguide segment, and a width of an orthographic projection of the reduced-width waveguide segment on the substrate is gradually decreased in the direction away from the first end face; and a plurality of waveguide segments of an $N^{th}$ sub-waveguide layer of the N sub-waveguide layers further include an equal-width waveguide segment extending to the first end face, and a width of an orthographic projection of the equal-width waveguide segment on the substrate is equal at all positions.

In some embodiments, each of the sub-waveguide layers includes a plurality of waveguide segments, the plurality of waveguide segments including a reduced-width waveguide segment and an equal-width waveguide segment, where a width of an orthographic projection of the reduced-width waveguide segment on the substrate is gradually decreased in the direction away from the first end face, and a width of an orthographic projection of the equal-width waveguide segment on the substrate is equal at all positions; a waveguide segment of an $N^{th}$ sub-waveguide layer of the N sub-waveguide layers extending to the first end face is an equal-width waveguide segment; and a waveguide segment of each of the sub-waveguide layers closest to the second end face is an equal-width waveguide segment.

In some embodiments, the waveguide segment of each of the sub-waveguide layers closest to the second end face is an equal-width waveguide segment having a triangular or trapezoidal cross-section.

In some embodiments, the spot-size conversion structure further includes: a first side face and a second side face that intersect with the first end face and the second end face; and a waveguide segment of at least one sub-waveguide layer of the N sub-waveguide layers other than the $N^{th}$ sub-waveguide layer extending to the first end face further extends to the first side face and/or the second side face.

In some embodiments, each of orthographic projections of the N sub-waveguide layers on the substrate has an axisymmetric structure with respect to the same axis.

In some embodiments, the spot-size conversion structure has a plurality of slots extending toward the substrate and exposing the substrate, and a communicating structure provided in the substrate and communicating the plurality of slots, where orthographic projections of the plurality of slots on the substrate are distributed on two sides of an orthographic projection of the waveguide layer on the substrate. In some embodiments, at least one slot is exposed to the second end face.

According to an aspect of the present disclosure, a photonic device is provided, including a spot-size conversion structure according to any one of the foregoing embodiments.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF THE DRAWINGS

More details, features, and advantages of the present disclosure are disclosed in the following description of exemplary embodiments with reference to the accompany drawings, in which.

DETAILED DESCRIPTION

Figure 1:
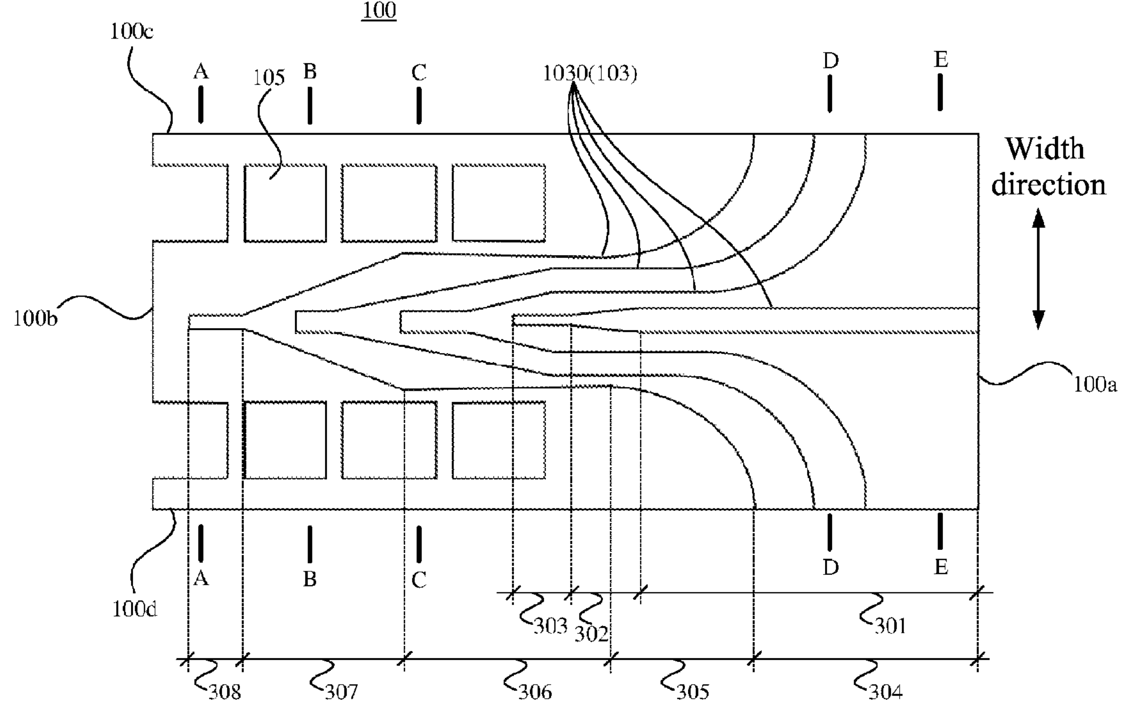
FIG. 1 is a top view of a spot-size conversion structure according to some exemplary embodiments of the present disclosure.
Figure 2A:
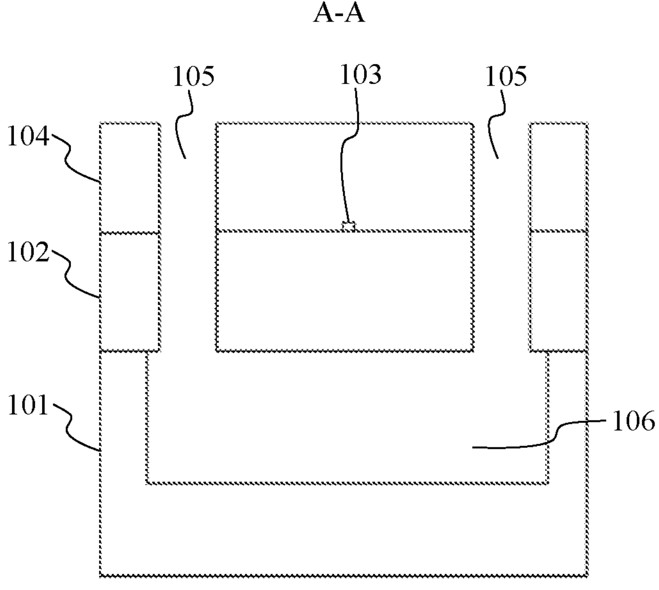
FIG. 2A is a schematic cross-sectional view according to some exemplary embodiments of the present disclosure at A-A in FIG. 1.
Figure 2B:
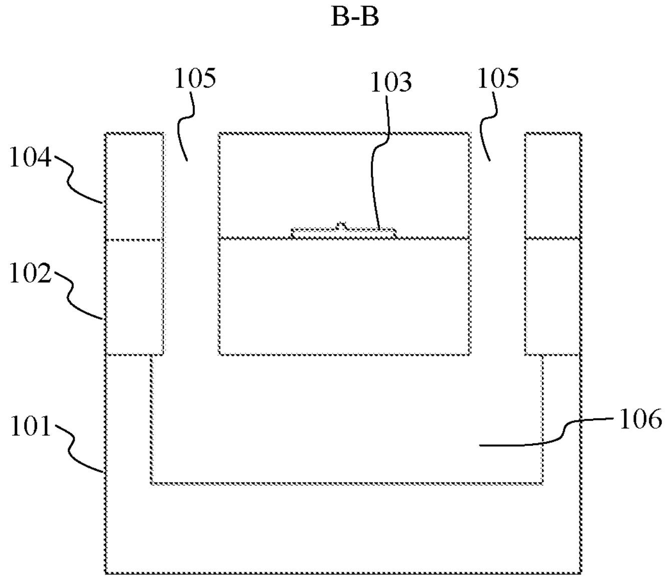
FIG. 2B is a schematic cross-sectional view according to some exemplary embodiments of the present disclosure at B-B in FIG. 1.
Figure 2C:
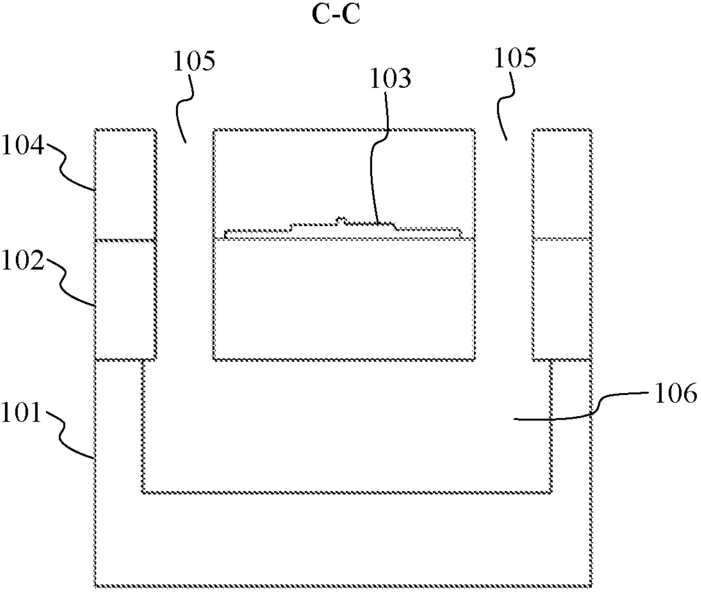
FIG. 2C is a schematic cross-sectional view according to some exemplary embodiments of the present disclosure at C-C in FIG. 1.
Figure 2D:
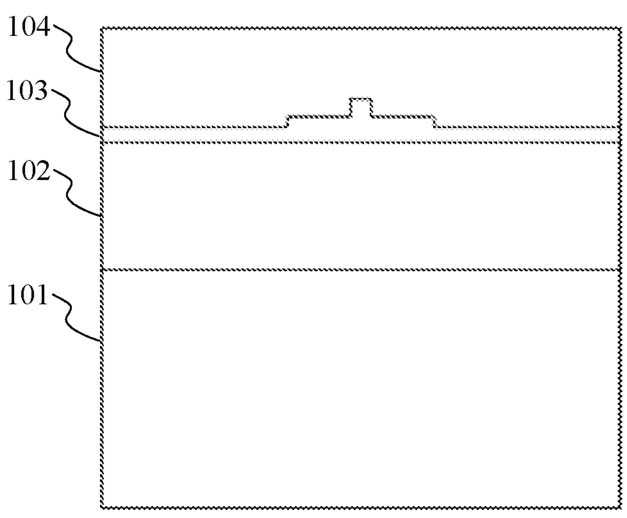
FIG. 2D is a schematic cross-sectional view according to some exemplary embodiments of the present disclosure at D-D in FIG. 1.
Figure 2E:
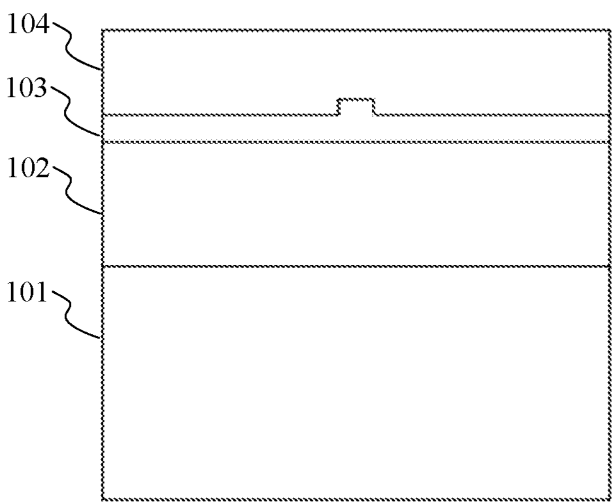
FIG. 2E is a schematic cross-sectional view according to some exemplary embodiments of the present disclosure at E-E in FIG. 1.

Only some exemplary embodiments are briefly described below. As can be appreciated by those skilled in the art, the described embodiments can be modified in various ways without departing from the spirit or scope of the present disclosure. Accordingly, the accompanying drawings and the description are considered as illustrative in nature, and not as restrictive.

Although the existing spot-size converters can functionally realize the coupling between an integrated optical waveguide and an optical fiber, the coupling efficiency between the integrated optical waveguide and the optical fiber is not high because of the large difference in spot size therebetween, resulting in a high loss of light energy. For example, the spot size of the integrated optical waveguide is generally of the order of hundreds of nanometers, while the spot size of the optical fiber, such as a flat-ended optical fiber, is of the order of tens of microns. Lost light energy may lead to severe heating of a coupling end face, thereby affecting the reliability and service life of a device. It can be understood that the coupling efficiency is a ratio of optical power emitted by the integrated optical waveguide to optical power received by the optical fiber, or a ratio of optical power emitted by the optical fiber to optical power received by the integrated optical waveguide.

Embodiments of the present disclosure provide a spot-size conversion structure and a photonic device to improve the coupling efficiency between the integrated optical waveguide and the optical fiber and reduce the optical loss during spot-size conversion.

As shown in FIG. 1, FIG. 2A, FIG. 2B, FIG. 2C, FIG. 2D, and FIG. 2E, the spot-size conversion structure 100 provided in some embodiments of the present disclosure includes a substrate 101, an isolation layer 102 and a waveguide layer 103 which are arranged in sequence. The waveguide layer 103 includes N (e.g., 4 as shown in the figures) sub-waveguide layers 1030 arranged in sequence along a direction away from the substrate 101, each of the sub-waveguide layers being of a protrusion shape, and N being a natural number and N≥3. The spot-size conversion structure 100 has a first end face 100*a* configured to be coupled to an integrated optical waveguide, and a second end face 100*b* opposite to the first end face 100*a* and configured to be coupled to an optical fiber. In the direction away from the substrate 101, an orthographic projection of the $(n+1)^{th}$ sub-waveguide layer 1030 on the substrate 101 falls within an orthographic projection of the $n^{th}$ sub-waveguide layer 1030 on the substrate 101, n being a natural number and 1≤n≤N−1. A width of an orthographic projection of each sub-waveguide layer 1030 on the substrate 101 is gradually narrowed in the direction away from the first end face 100*a*. A wide end of each sub-waveguide layer 1030 extends to the first end face 100*a*, a narrow end of a first sub-waveguide layer 1030 extends to the second end face 100*b* or is at a distance from the second end face 100*b*, and a narrow end of the $(n+1)^{th}$ sub-waveguide layer 1030 is at a distance from a narrow end of the $n^{th}$ sub-waveguide layer 1030.

In the direction away from the substrate 101, the N sub-waveguide layers 1030 are the first sub-waveguide layer, the second sub-waveguide layer, the third sub-waveguide layer, . . . , the $(N-1)^{th}$ sub-waveguide layer, and the $N^{th}$ sub-waveguide layer, respectively. In an embodiment shown in FIG. 1, N=4, and in an embodiment shown in FIG. 3, N=3. In addition, N may also be other numbers, such as N=5 or N=6, etc.

In embodiments of the present disclosure, the length direction is defined as a direction in which the light is transmitted in the waveguide layer 103, and the width direction is defined as parallel to the substrate 101 and orthogonal to the direction in which the light is transmitted in the waveguide layer 103. The first end face 100*a* and the second end face 100*b* are arranged substantially along the direction in which the light is transmitted in the waveguide layer 103. In addition to the first end face 100*a* and the second end face 100*b*, the spot-size conversion structure 100 further includes a first side face 100*c* and a second side face 100*d* that intersect with the first end face 100*a* and the second end face 100*b*. In an embodiment, the first end face 100*a* is parallel to the second end face 100*b*, and the first side face 100*c* is parallel to the second side face 100*d*.

As shown in FIG. 2A, FIG. 2B, FIG. 2C, FIG. 2D, and FIG. 2E, in some embodiments of the present disclosure, the spot-size conversion structure 100 further includes a cover layer 104 on a side of the waveguide layer 103 away from the substrate 101. A refractive index n1 of the waveguide layer 103, a refractive index n2 of the cover layer 104, a refractive index n3 of the isolation layer 102 and a refractive index n4 of the substrate 101 satisfy: n1>n2 and n1>n3. The refractive index of the isolation layer 102 and the refractive index of the cover layer 104 are less than that of the waveguide layer 103, so that light may be mainly confined to transmitting in the waveguide layer 103. After the waveguide layer 103 narrows to disappear completely, portions of the isolation layer 102 and the cover layer 104 close to the second end face 100*b* form a waveguide structure used for light transmission. In some other embodiments of the present disclosure, the spot-size conversion structure 100 may also not include the cover layer 104.

It is possible that the first end face 100*a* of the spot-size conversion structure 100 serves as an optical input side end face of the spot-size conversion structure 100, and the second end face 100*b* serves as an optical output side end face of the spot-size conversion structure 100. Specifically, light enters the spot-size conversion structure 100 from a wide end of the N sub-waveguide layers 1030, and is output from the second end face 100*b* of the spot-size conversion structure 100. It is also possible that the first end face 100*a* of the spot-size conversion structure 100 serves as an optical output side end face of the spot-size conversion structure 100, and the second end face 100*b* serves as an optical input side end face of the spot-size conversion structure 100. Specifically, light enters the spot-size conversion structure 100 from the second end face 100*b* of the spot-size conversion structure 100, and is output from the wide end of the N sub-waveguide layers 1030. Since a spot size of the waveguide structure formed by the portions of the isolation layer 102 and the cover layer 104 close to the second end face 100*b* substantially matches a spot size of the optical fiber, the spot-size conversion structure 100 may couple better with the optical fiber at the second end face 100*b*.

Some spot-size conversion structures in related art have a waveguide layer including two sub-waveguide layers, which are a plate layer in a plate-like shape and a ridge layer protruding from the plate layer. Although the width of the orthographic projection of the two sub-waveguide layers on the substrate may also be gradually narrowed in the direction away from the first end face, due to a limitation of a size of an end face on one side required to be coupled to the integrated optical waveguide, thicknesses of the two sub-waveguide layers, especially a thickness of the plate layer, cannot be designed to be smaller. For example, the thickness of the plate layer is usually in a range of about 300 nanometers. When the thickness of the plate layer is large, it is difficult to further narrow a width of a narrow end of the plate layer due to the limitations of the manufacturing process.

In embodiments of the present disclosure, the waveguide layer 103 has more freedom in shape design and may be designed to be smoother (e.g., the first sub-waveguide layer in the figures may present a gentler narrowing of width by providing more waveguide segments), so that a spot transition from the first end face to the second end face or a spot transition from the second end face to the first end face may be smoother. On the other hand, on the premise of satisfying the design requirements for the coupling size of the first end face 100*a* (i.e., the thicknesses of the $N^{th}$ and $(N-1)^{th}$ sub-waveguide layers are able to satisfy the design requirements for the coupling size of the first end face 100*a*), the thickness of the first sub-waveguide layer to the thickness of the $(N-2)^{th}$ sub-waveguide layer may be designed as small as possible in accordance with the requirements, and the width of the narrow end of the first sub-waveguide layer to the width of the narrow end of the $(N-2)^{th}$ sub-waveguide layer may be freed from the limitations of the manufacturing process. The thicknesses may be designed as small as possible in accordance with the requirements, so that more light may be forced to overflow from the waveguide layer 103 and subsequently to be output from the second end face 100*b* (where the first end face 100*a* is a light input side end face and the second end face 100*b* is a light output side end face), or more light is forced to enter the waveguide layer 103 (where the second end face 100*b* is a light input side end face and the first end face 100*a* is a light output side end face).

Therefore, the solutions in embodiments of the present disclosure may improve the freedom in the design of thickness and narrow end size of some sub-waveguide layers, so as to improve the freedom in the design of thickness and narrow end size of the waveguide layer, thereby minimizing light transmission loss and improving the coupling efficiency of the spot-size conversion structure.

In some embodiments of the present disclosure, based on the improvements described above, a thickness c of at least one of the sub-waveguide layers other than the $N^{th}$ and $(N-1)^{th}$ sub-waveguide layers satisfies: $c \leq 200$ nm. In an example of the waveguide layer including four sub-waveguide layers, the thickness of at least one of the first sub-waveguide layer and the second sub-waveguide layer may be designed to be less than or equal to 200 nm. In an example of the waveguide layer including three sub-waveguide layers, the thickness of the first sub-waveguide layer may be designed to be less than or equal to 200 nm.

In embodiments of the present disclosure, each sub-waveguide layer may include one or more waveguide segments, which shall include at least a reduced-width waveguide segment. The reduced-width waveguide segment refers to a waveguide segment of which a width of an orthographic projection on the substrate is gradually decreased in the direction away from the first end face. The present disclosure does not specifically limit the number and structural shape of the waveguide segments in each sub-waveguide layer. For example, when the sub-waveguide layer includes a plurality of waveguide segments, a waveguide segment of the sub-waveguide layer closest to the second end face may be either an equal-width waveguide segment or a reduced-width waveguide segment. The equal-width waveguide segment is a waveguide segment of which a width of an orthographic projection on the substrate is equal at all positions. The following are merely some exemplary embodiments.

In some embodiments of the present disclosure, each sub-waveguide layer includes a plurality of waveguide segments, and the plurality of waveguide segments include a reduced-width waveguide segment and an equal-width waveguide segment. The width of the orthographic projection of the reduced-width waveguide segment on the substrate 101 is gradually decreased, e.g., gradually linearly or nonlinearly decreased, in the direction away from the first end face 100*a*, and the width of the orthographic projection of the equal-width waveguide segment on the substrate 101 is equal at all positions. A waveguide segment of the $N^{th}$ sub-waveguide layer extending to the first end face 100*a* is an equal-width waveguide segment; and a waveguide segment of each sub-waveguide layer closest to the second end face 100*b* is an equal-width waveguide segment. In the embodiment as shown in FIG. 1, the third sub-waveguide layer includes: a first equal-width waveguide segment 301, a first reduced-width waveguide segment 302 and a second equal-width waveguide segment 303 arranged in sequence in the direction away from the first end face 100*a*. Each of the first sub-waveguide layer and the second sub-waveguide layer includes: a third equal-width waveguide segment 304, a second reduced-width waveguide segment 305, a fourth equal-width waveguide segment 306, a third reduced-width waveguide segment 307 and a fifth equal-width waveguide segment 308 arranged in sequence in the direction away from the first end face 100*a*. Of course, the number of the waveguide segments in each sub-waveguide layer may be the same or different.

In some other embodiments of the present disclosure, each sub-waveguide layer includes a plurality of waveguide segments, and the plurality of waveguide segments include a reduced-width waveguide segment. A width of an orthographic projection of the reduced-width waveguide segment on the substrate is gradually linearly or nonlinearly decreased in the direction away from the first end face. A plurality of waveguide segments of an $N^{th}$ sub-waveguide layer further include an equal-width waveguide segment extending to the first end face, and a width of an orthographic projection of the equal-width waveguide segment on the substrate is equal at all positions. In these embodiments, the sub-waveguide layers other than the $N^{th}$ sub-waveguide layer may include only the reduced-width waveguide segment, or may include both the reduced-width waveguide segment and the equal-width waveguide segment.

Each sub-waveguide layer in embodiments of the present disclosure includes at least one reduced-width waveguide segment so as to achieve narrowing the width of the sub-waveguide layer. Furthermore, it is required that the waveguide segment of the $N^{th}$ sub-waveguide layer extending to the first end face is an equal-width waveguide segment. According to the design requirements, the waveguide segment of at least one sub-waveguide layer closest to the second end face 100*b* may also be an equal-width waveguide segment or a reduced-width waveguide segment.

The waveguide segment of each sub-waveguide layer closest to the second end face 100*b* is an equal-width waveguide segment with a triangular or trapezoidal cross-section, e.g., an isosceles triangular or isosceles trapezoidal cross-section. The design may be conducive to the transmission of the light between the sub-waveguide layers, such as passing through an equal-width waveguide segment of an upper sub-waveguide layer close to the second end face 100*b* and entering a lower sub-waveguide layer, or passing through an equal-width waveguide segment of the first sub-waveguide layer close to the second end face 100*b* and entering the isolation layer 102, thereby improving the efficiency of light transmission and further improving the coupling efficiency between the integrated optical waveguide and the optical fiber.

Figure 3:
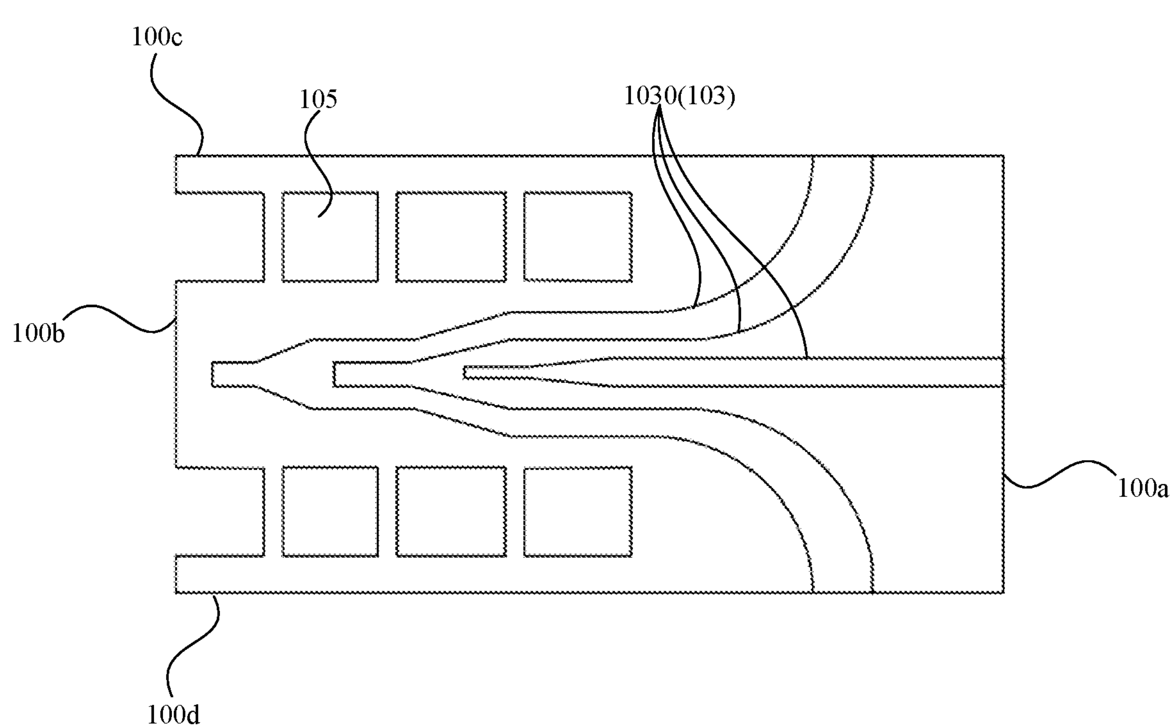
FIG. 3 is a top view of a spot-size conversion structure according to some other exemplary embodiments of the present disclosure.

As shown in FIG. 1 or FIG. 3, other than the $N^{th}$ sub-waveguide layer, the waveguide segment of each sub-waveguide layer (which may also be one or some sub-waveguide layers closer to the substrate) extending to the first end face 100*a* is an equal-width waveguide segment extending to the first end face 100*a*, the first side face 100*c* and the second side face 100*d* simultaneously. In this way, the spot-size conversion structure 100 may be adapted to an integrated optical waveguide with a larger spot size, thereby improving the applicability of the spot-size conversion structure 100.

As shown in FIG. 1 or FIG. 3, each of the orthographic projections of the N sub-waveguide layers 1030 on the substrate 101 has an axisymmetric structure with respect to the same axis (not shown in the figure). Embodiments of the present disclosure are not limited to designing the N sub-waveguide layers as axisymmetric structures, and the N sub-waveguide layers may also be of asymmetric structures. For example, the sub-waveguide layer may be gradually narrowed only on a single side.

In some embodiments, as shown in FIG. 2A, FIG. 2B, FIG. 2C, FIG. 2D, and FIG. 2E, the spot-size conversion structure 100 further includes a cover layer 104 on a side of the waveguide layer 103 away from the substrate 101, and the spot-size conversion structure 100 has a plurality of slots 105 extending from a surface of the cover layer 104 toward the substrate 101 and exposing the substrate 101, and a communicating structure 106 provided in the substrate 101 and communicating the plurality of slots 105. Orthographic projections of the plurality of slots 105 on the substrate 101 are distributed on two sides of the orthographic projection of the waveguide layer 103 on the substrate 101. In addition, at least one slot 105 is exposed to the second end face 100*b*. In some embodiments, the spot-size conversion structure may also not include the cover layer, and the plurality of slots extend from a surface of the isolation layer toward the substrate and expose the substrate. Since light is mainly transmitted in a medium, such design has a restricting effect on the light input or output from the second end face 100*b*, so that the diffusion of light into the substrate 101 may be prevented, thereby reducing the light transmission loss, achieving better coupling to the optical fiber, and further improving the coupling efficiency between the integrated optical waveguide and the optical fiber.

Figure 4:
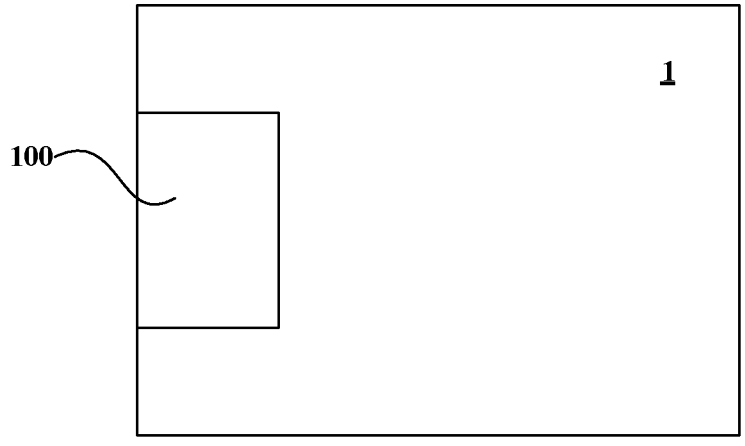
FIG. 4 is a structural block diagram of a photonic device according to some exemplary embodiments of the present disclosure.

As shown in FIG. 4, an embodiment of the present disclosure further provides a photonic device 1, including the spot-size conversion structure 100 according to any one of the foregoing embodiments. The specific product type of the photonic device 1 is not limited, for example, it may be an electro-optical modulator, a splitter, a star coupler, a variable optical attenuator (VOA), an optical switch, a frequency comb, an array waveguide grating (AWG), and the like.

The spot-size conversion structure 100 is integrated in the photonic device 1. Since the spot-size conversion structure 100 has a higher coupling efficiency, the optical loss of the photonic device 1 is smaller and the performance is improved.

It should be understood that, in this description, the orientations or positional relationships or dimensions denoted by the terms, such as “center”, “longitudinal”, “transverse”, “length”, “width”, “thickness”, “upper”, “lower”, “front”, “rear”, “left”, “right”, “vertical”, “horizontal”, “top”, “bottom”, “inner”, “outer”, “clockwise”, “counterclockwise”, “axial”, “radial” and “circumferential”, are the orientations or positional relationships or dimensions shown on the basis of the accompanying drawings, and these terms are used merely for ease of description, rather than indicating or implying that the device or element referred to must have particular orientations and be constructed and operated in the particular orientations, and therefore should not be construed as limiting the scope of protection of the present disclosure.

In addition, the terms such as “first”, “second” and “third” are merely for descriptive purposes and should not be construed as indicating or implying relative importance or implicitly indicating the number of technical features indicated. Thus, the features defined with “first”, “second” and “third” may explicitly or implicitly include one or more features. In the description of the present disclosure, the term “a plurality of” means two or more, unless otherwise explicitly and specifically defined.

In the present disclosure, unless expressly stated or defined otherwise, the terms such as “mounting”, “connection”, “connected” and “fixing” should be interpreted broadly, for example, they may be a fixed connection, a detachable connection, or an integrated connection; may be a mechanical connection, or an electrical connection, or communication; and may be a direct connection or an indirect connection by means of an intermediate medium, or may be internal communication between two elements or interaction between the two elements. For those of ordinary skill in the art, the specific meanings of the above terms in the present disclosure can be understood according to specific circumstances.

In the present disclosure, unless expressly stated or defined otherwise, the expression of the first feature being “above” or “below” the second feature may include the case that the first feature is in direct contact with the second feature, or the case that the first feature and the second feature are not in direct contact but are contacted via another feature therebetween. Furthermore, the first feature being "over", "above" or "on" the second feature includes the case that the first feature is directly or obliquely above the second feature, or merely indicates that the first feature is at a higher level than the second feature. The first feature being "below", "under" or "beneath" the second feature includes the case that the first feature is directly or obliquely below the second feature, or merely indicates that the first feature is at a lower level than the second feature.

This description provides many different implementations or examples that can be used to implement the present disclosure. It should be understood that these different implementations or examples are purely illustrative and are not intended to limit the scope of protection of the present disclosure in any way. On the basis of the disclosure of the description of the present disclosure, those skilled in the art will be able to conceive of various changes or substitutions. All these changes or substitutions shall fall within the scope of protection of the present disclosure. Therefore, the scope of protection of the present disclosure shall be subject to the scope of protection of the claims.

What is claimed is:

1. A spot-size conversion structure, comprising: a substrate, an isolation layer and a waveguide layer arranged in sequence, the waveguide layer comprising N sub-waveguide layers arranged in sequence along a direction away from the substrate, each of the sub-waveguide layers being of a protrusion shape, and N being a natural number and N≥3, wherein:

- the spot-size conversion structure has a first end face configured to be coupled to an integrated optical waveguide, and a second end face opposite to the first end face and configured to be coupled to an optical fiber;
- in the direction away from the substrate, an orthographic projection of an $(n+1)^{th}$ sub-waveguide layer of the N sub-waveguide layers on the substrate falls within an orthographic projection of an $n^{th}$ sub-waveguide layer of the N sub-waveguide layers on the substrate, n being a natural number and 1≤n≤N−1;
- a width of an orthographic projection of each of the sub-waveguide layers on the substrate is gradually narrowed in a direction away from the first end face; and
- a wide end of each of the sub-waveguide layers extends to the first end face, a narrow end of a first sub-waveguide layer extends to the second end face or is at a distance from the second end face, and a narrow end of the $(n+1)^{th}$ sub-waveguide layer is at a distance from a narrow end of the $n^{th}$ sub-waveguide layer, wherein
- each of the sub-waveguide layers comprises a plurality of waveguide segments, the plurality of waveguide segments comprising a reduced-width waveguide segment and an equal-width waveguide segment, wherein a width of an orthographic projection of the reduced-width waveguide segment on the substrate is gradually decreased in the direction away from the first end face, and a width of an orthographic projection of the equal-width waveguide segment on the substrate is equal at all positions;
- a waveguide segment of an $N^{th}$ sub-waveguide layer of the N sub-waveguide layers extending to the first end face is an equal-width waveguide segment; and
- a waveguide segment of each of the sub-waveguide layers closest to the second end face is an equal-width waveguide segment.

2. The spot-size conversion structure according to claim 1, wherein

- a thickness c of at least one sub-waveguide layer of the N sub-waveguide layers other than an $N^{th}$ sub-waveguide layer and an $(N-1)^{th}$ sub-waveguide layer satisfies: c≤200 nm.

3. The spot-size conversion structure according to claim 1, wherein

- each of the sub-waveguide layers comprises a plurality of waveguide segments, the plurality of waveguide segments comprising a reduced-width waveguide segment, and a width of an orthographic projection of the reduced-width waveguide segment on the substrate is gradually decreased in the direction away from the first end face; and
- a plurality of waveguide segments of an $N^{th}$ sub-waveguide layer of the N sub-waveguide layers further comprise an equal-width waveguide segment extending to the first end face, and a width of an orthographic projection of the equal-width waveguide segment on the substrate is equal at all positions.

4. The spot-size conversion structure according to claim 1, wherein

- the waveguide segment of each of the sub-waveguide layers closest to the second end face is an equal-width waveguide segment having a triangular or trapezoidal cross-section.

5. The spot-size conversion structure according to claim 1, wherein

- the spot-size conversion structure further comprises: a first side face and a second side face that intersect with the first end face and the second end face; and
- a waveguide segment of at least one sub-waveguide layer of the N sub-waveguide layers other than the $N^{th}$ sub-waveguide layer extending to the first end face further extends to at least one of the first side face or the second side face.

6. The spot-size conversion structure according to claim 1, wherein

- each of orthographic projections of the N sub-waveguide layers on the substrate has an axisymmetric structure with respect to a same axis.

7. The spot-size conversion structure according to claim 1, wherein

- the spot-size conversion structure has a plurality of slots extending toward the substrate and exposing the substrate, and a communicating structure provided in the substrate and communicating the plurality of slots, wherein orthographic projections of the plurality of slots on the substrate are distributed on two sides of an orthographic projection of the waveguide layer on the substrate.

8. The spot-size conversion structure according to claim 7, wherein at least one slot of the plurality of slots is exposed to the second end face.

9. A photonic device, comprising a spot-size conversion structure, the spot-size conversion structure including: a substrate, an isolation layer and a waveguide layer arranged in sequence, the waveguide layer comprising N sub-waveguide layers arranged in sequence along a direction away from the substrate, each of the sub-waveguide layers being of a protrusion shape, and N being a natural number and N≥3, wherein:

- the spot-size conversion structure has a first end face configured to be coupled to an integrated optical waveguide, and a second end face opposite to the first end face and configured to be coupled to an optical fiber;

in the direction away from the substrate, an orthographic projection of an $(n+1)^{th}$ sub-waveguide layer of the N sub-waveguide layers on the substrate falls within an orthographic projection of an $n^{th}$ sub-waveguide layer of the N sub-waveguide layers on the substrate, n being a natural number and $1 \leq n \leq N-1$;

a width of an orthographic projection of each of the sub-waveguide layers on the substrate is gradually narrowed in a direction away from the first end face; and a wide end of each of the sub-waveguide layers extends to the first end face, a narrow end of a first sub-waveguide layer extends to the second end face or is at a distance from the second end face, and a narrow end of the $(n+1)^{th}$ sub-waveguide layer is at a distance from a narrow end of the $n^{th}$ sub-waveguide layer, wherein each of the sub-waveguide layers comprises a plurality of waveguide segments, the plurality of waveguide segments comprising a reduced-width waveguide segment and an equal-width waveguide segment, wherein a width of an orthographic projection of the reduced-width waveguide segment on the substrate is gradually decreased in the direction away from the first end face, and a width of an orthographic projection of the equal-width waveguide segment on the substrate is equal at all positions;

a waveguide segment of an $N^{th}$ sub-waveguide layer of the N sub-waveguide layers extending to the first end face is an equal-width waveguide segment; and a waveguide segment of each of the sub-waveguide layers closest to the second end face is an equal-width waveguide segment.

10. The photonic device according to claim 9, wherein a thickness c of at least one sub-waveguide layer of the N sub-waveguide layers other than an $N^{th}$ sub-waveguide layer and an $(N-1)^{th}$ sub-waveguide layer satisfies: $c \leq 200$ nm.

11. The photonic device according to claim 9, wherein each of the sub-waveguide layers comprises a plurality of waveguide segments, the plurality of waveguide segments comprising a reduced-width waveguide segment, and a width of an orthographic projection of the reduced-width waveguide segment on the substrate is gradually decreased in the direction away from the first end face; and a plurality of waveguide segments of an $N^{th}$ sub-waveguide layer of the N sub-waveguide layers further comprise an equal-width waveguide segment extending to the first end face, and a width of an orthographic projection of the equal-width waveguide segment on the substrate is equal at all positions.

12. The photonic device according to claim 9, wherein the waveguide segment of each of the sub-waveguide layers closest to the second end face is an equal-width waveguide segment having a triangular or trapezoidal cross-section.

13. The photonic device according to claim 9, wherein the spot-size conversion structure further comprises: a first side face and a second side face that intersect with the first end face and the second end face; and a waveguide segment of at least one sub-waveguide layer of the N sub-waveguide layers other than the $N^{th}$ sub-waveguide layer extending to the first end face further extends to at least one of the first side face or the second side face.

14. The photonic device according to claim 9, wherein each of orthographic projections of the N sub-waveguide layers on the substrate has an axisymmetric structure with respect to the same axis.

15. The photonic device according to claim 9, wherein the spot-size conversion structure has a plurality of slots extending toward the substrate and exposing the substrate, and a communicating structure provided in the substrate and communicating the plurality of slots, wherein orthographic projections of the plurality of slots on the substrate are distributed on two sides of an orthographic projection of the waveguide layer on the substrate.

16. The photonic device according to claim 15, wherein at least one slot of the plurality of slots is exposed to the second end face.

* * * * *